United States Patent [19]
McGuinness et al.

[11] Patent Number: 5,720,008
[45] Date of Patent: Feb. 17, 1998

[54] KNOWLEDGE BASE MANAGEMENT SYSTEM WITH DEPENDENCY INFORMATION FOR PROCEDURAL TESTS

[75] Inventors: Deborah L. McGuinness, Summit; Peter Patel-Schneider, Westfield; Lori Alperin Resnick, Highland Park, all of N.J.

[73] Assignee: Lucent Technologies Inc., Murray Hill, N.J.

[21] Appl. No.: 807,189

[22] Filed: Feb. 27, 1997

Related U.S. Application Data

[63] Continuation of Ser. No. 247,722, May 25, 1994, abandoned.

[51] Int. Cl.$^6$ ................................................ G06F 15/18
[52] U.S. Cl. ................................................ 395/62
[58] Field of Search ........................ 395/62, 75, 759, 395/183.02, 353, 617, 604, 51, 76, 61, 445, 619

[56] References Cited

U.S. PATENT DOCUMENTS

| | | | |
|---|---|---|---|
| 4,658,370 | 4/1987 | Erman et al. | 395/76 |
| 4,860,213 | 8/1989 | Bonissone | 395/61 |
| 4,868,733 | 9/1989 | Fujisawa et al. | 395/605 |
| 4,930,071 | 5/1990 | Tou et al. | 395/604 |
| 4,935,876 | 6/1990 | Hanatsuka | 395/51 |
| 4,970,657 | 11/1990 | Wolf . | |
| 4,972,328 | 11/1990 | Wu et al. | 395/675 |
| 5,099,424 | 3/1992 | Schneiderman | 395/203 |
| 5,107,499 | 4/1992 | Lirov et al. | 395/183.02 |
| 5,107,500 | 4/1992 | Wakamoto et al. | 395/183.02 |
| 5,115,504 | 5/1992 | Belove et al. | 395/611 |
| 5,119,475 | 6/1992 | Smith et al. | 395/353 |
| 5,133,075 | 7/1992 | Risch | 395/800 |
| 5,185,887 | 2/1993 | Takahashi et al. | 395/619 |
| 5,257,185 | 10/1993 | Farley et al. | 395/611 |
| 5,295,230 | 3/1994 | Kung | 395/75 |
| 5,377,345 | 12/1994 | Chang et al. | 395/445 |
| 5,386,559 | 1/1995 | Eisenberg et al. | 395/617 |
| 5,398,325 | 3/1995 | Chang et al. | 395/403 |
| 5,404,506 | 4/1995 | Fujisawa et al. | 395/604 |
| 5,418,943 | 5/1995 | Borgida et al. | 395/604 |
| 5,424,947 | 6/1995 | Nagao et al. | 395/759 |
| 5,465,319 | 11/1995 | Ahamed | 395/11 |

OTHER PUBLICATIONS

Expert Systems Applications. Expersys-90, Los Angeles, CA 7-8 Nov. 1990, pp. 281-286.
International Journal of Software Engineering and Knowledge Engineering, Dec. 1991, Singapore, vol. 1, No. 4, pp. 413-438.

(List continued on next page.)

Primary Examiner—Robert W. Downs
Assistant Examiner—Sanjiv Shah

[57] ABSTRACT

A knowledge representation system which allows a user to generate, maintain and access information in a knowledge base using a description language is disclosed. The knowledge representation system maintains the dependency relationships between the different objects that are stored in the knowledge base so that pieces of information that are related to or dependent upon added or updated information may be properly classified at all times. The knowledge representation system includes a mechanism for processing dependency information that is returned from user-defined test functions in order to accurately maintain the dependency information implicated upon execution of the user-defined procedural test functions. A subsumption function determines if a particular individual in the knowledge base satisfies a concept. The subsumption function evaluates each component of a concept description and maintains the dependency information implicated by the concept component. A test restriction evaluation subroutine determines whether test restriction components of the concept are satisfied and processes the dependency information that is returned from the user-defined procedural test functions.

11 Claims, 8 Drawing Sheets

OTHER PUBLICATIONS

International Conference on Vector and Parallel Processors in Computational Science III, Liverpool, UK, 25–28 Aug. 1987, vol. 8, No. 1–3, pp. 111–119.

Future Databases '92. Proceedings of the Second Far East Workshop on Future Database Systems, Kyoto, Japan, 26–28, Apr. 1992, pp. 256–265.

Borgida, A. et al., "CLASSIC: A Structural Data Model for Objects," Proc. of the 1989 ACM SIGMOD Int'l Conf. on the Management of Data, Portland, Or., vol. 18, No. 2, Jun. 1989, pp. 58–67.

Brachman, R.J. et al., "The CLASSIC Knowledge Representation System, or, KL–ONE: The Next Generation," Proc. of the Int'l Conf. on Fifth Generation Systems, Tokyo, Japan, Jun. 1992, 18 pages.

Brachman, R.J. et al., "Integrated Support for Data Archaeology," Int'l J. of Intelligent and Cooperative Information Systems, vol. 2, No. 2, 1993, pp. 159–185.

Brachman, R.J. et al., "Living with CLASSIC: When and How to Use a KL–ONE–Like Language," in J. Sowa, ed., Principles of Semantic Networks: Explorations in the Representation of Knowledge; Morgan–Kaufmann Publishers, 1991, pp. 401–456.

Brachman, R.J., "'Reducing' CLASSIC to Practice: Knowledge Representation Theory Meets Reality," Principles of Knowledge Representation and Reasoning: Proc. of the Third Int'l Conf. (KR'92), Oct. 1992, 12 pages.

Brill, D., *Loom Reference Manual, Version 2.0*, University of Southern California (Dec. 1993).

Doyle, J., "A Truth Maintenance System," Artificial Intelligence, vol. 12, No. 3, Nov. 1979, North–Holland Publishing Company, pp. 231–272.

Hoppe, T. et al., *BACK V5 Tutorial & Manual*, Technical University Berlin, Institute for Software and Theoretical Information, Project KIT–BACK, W–1000 Berlin 10, Germany (Mar., 1993).

Wright, J.R. et al., "A Knowledge–Based Configurator that Supports Sales, Engineering, and Manufacturing at AT&T Network Systems," Proc. of the Fifth Innovative Application of Artificial Intelligence Conf., Washington, D.C., pp. 183–193 (Jul. 11–15, 1993), reprinted in AI Magazine, vol. 14, No. 3, pp. 69–80 (Fall 1993).

Tanaka et al., A visual user interface for map information retrieval based on semantic significance, IEEE Transactions on Software Engineering, pp. 666–670, May 1988.

Thuraisingham et al., Secure query processing using AI techniques, Proceedings of the 21st annual Hawaii International conference on system sciences. pp. 561–570, Jan. 8, 1988.

Beck et al., Classification as a query processing technique in the CANDIDE semantic data model, Proceedings of the 5th International conference on Data Engineering, pp. 572–581, Feb. 10, 1989.

;; Define Test Functions

L10  (defun instance-of-doctor (ind)

L15    (let ((doctor-concept (cl-named-concept 'doctor))

L20       (cl-instance? ind doctor-concept)))

. . .

L25  (defun doctor-child-test-function (ind)

L30    (let* ((child-role (cl-named-role 'child))

L35        (children (cl-fillers individual child-role))

L40        (doctorchild   (find-if #'instance-of-doctor
                                        children)))

L45    (if doctor-child

L50      (values t nil (list doctor-child))

L55      (values '? children nil))))

. . .

;; Define Roles and Concepts

L105     define roles child friend

L110     define concept thing

L115     define concept person as subtype of thing

L118     define concept animal as subtype of thing

L120     define concept happy-person as subtype of person

L125     define concept doctor as subtype of person

L130     define concept surgeon as subtype of doctor

FIG. 3a

L135    define concept at-least-1-doctor-child as
            person and doctor-child-test-function L140    define concept at-least-1-doctor-child-and-
            happy-friends as at-least-1-doctor-child
            and all friend happy-person ;; Create Individuals:

L155    create individual fred as person

L160    create individual susan as person and
            fill child fred

L165    create individual mary as person

L170    create individual sam as surgeon

L175    create individual jane as person and
            fill child sam mary

L180    create individual nancy as doctor

L185    create individual amy as happy-person

L190    create individual barbara as person

L195    create individual joe as person and
            fill child nancy and
            fill friend amy barbara and
            at-most 2 friend L200    create individual bob as doctor L205    create individual janet as happy-person L210    create individual betty as person and
            fill child bob and
            fill friend janet and
            at-most 1 friend

FIG. 3b

RECORD R₁ -- Susan

Parent Concept:    PERSON

Child:             Fred
Friend:            NIL

POS-DEPENDS-ON-ME  NIL
POS-I-DEPEND-ON    Fred
NEG-DEPENDS-ON-ME  NIL
NEG-I-DEPEND-ON    NIL

RECORD R₂ -- Jane

Parent Concept:    AT-LEAST-1-DOCTOR-CHILD

Child:             Sam;  Mary
Friend:            NIL

POS-DEPENDS-ON-ME  NIL
POS-I-DEPEND-ON    NIL
NEG-DEPENDS-ON-ME  NIL
NEG-I-DEPEND-ON    Sam

RECORD R₃ -- Joe

Parent Concept:    AT-LEAST-1-DOCTOR-CHILD

Child:             Nancy
Friend:            Amy;  Barbara

POS-DEPENDS-ON-ME  NIL
POS-I-DEPEND-ON    Barbara
NEG-DEPENDS-ON-ME  NIL
NEG-I-DEPEND-ON    Nancy

RECORD R₄ -- Betty

Parent Concept:
AT-LEAST-1-DOCTOR-CHILD-AND-HAPPY-FRIENDS

Child:             Bob
Friend:            Janet

POS-DEPENDS-ON-ME  NIL
POS-I-DEPEND-ON    NIL
NEG-DEPENDS-ON-ME  NIL
NEG-I-DEPEND-ON    Janet; Bob

FIG. 4

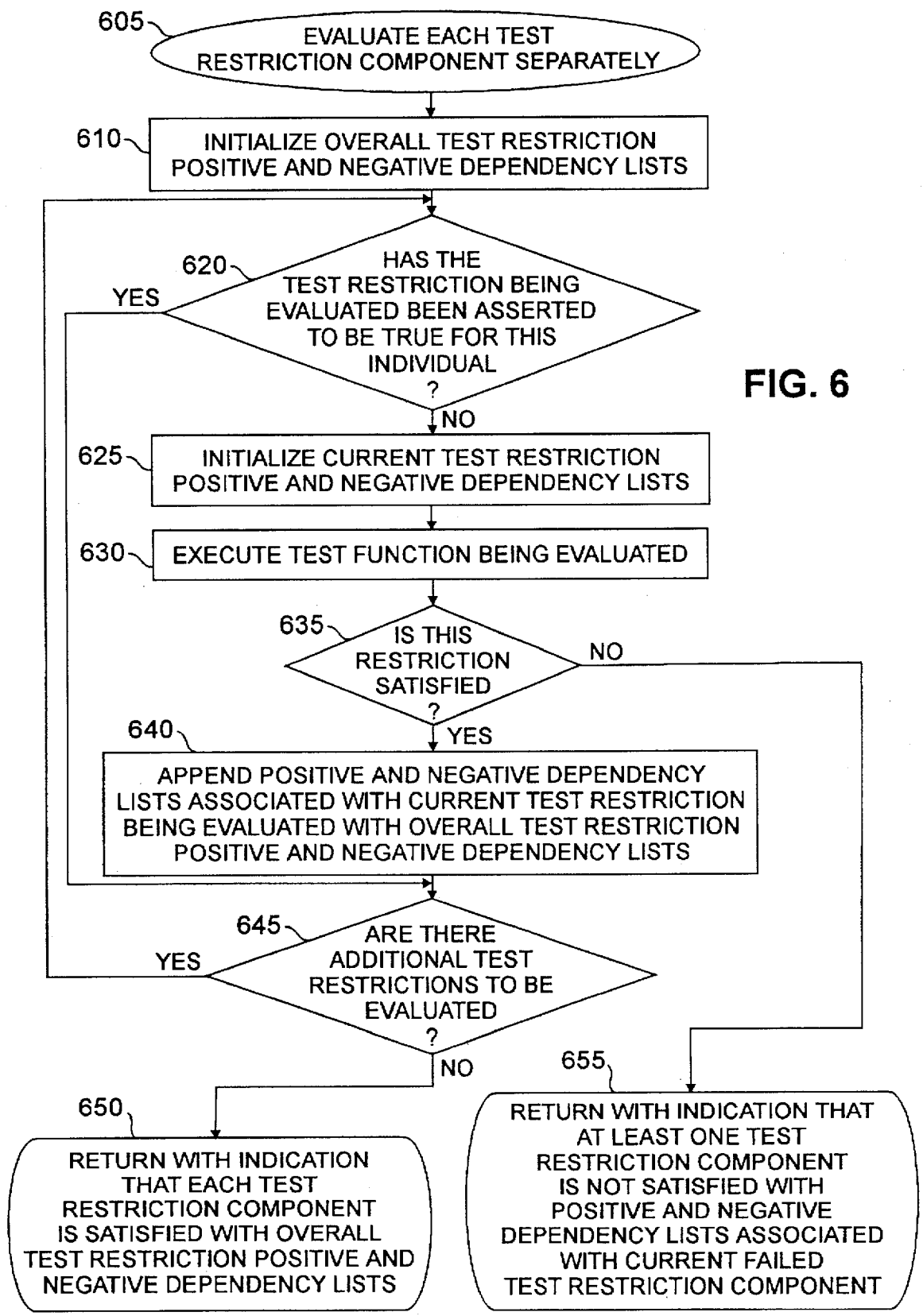

KNOWLEDGE BASE MANAGEMENT SYSTEM WITH DEPENDENCY INFORMATION FOR PROCEDURAL TESTS

This is a continuation of application Ser. No. 08/247,722 filed on May 25, 1994 now abandoned.

FIELD OF THE INVENTION

The present invention relates to a knowledge base management system, and more particularly, to a method and apparatus in a knowledge representation system for accurately maintaining dependency information for user-defined procedural tests.

BACKGROUND OF THE INVENTION

Recently, a number of knowledge base management systems have been developed which codify information in a knowledge base and provide a mechanism for users to access and maintain the stored information. For a general introduction to knowledge bases, see Ronald J. Brachman, "The Basics of Knowledge Representation and Reasoning," AT&T Technical Journal, Vol. 67, No. 1, pp. 7–24 (Jan./Feb. 1988) and J. Sowa, ed., Principles of Semantic Networks: Explorations in the Representation of Knowledge, Morgan-Kaufmann Publishers (1991).

Generally, information for a particular domain is developed through a knowledge engineering process which requires a domain expert to translate his or her knowledge into a collection of declarative expressions which embody the expert's knowledge. In addition, the expert can generate a set of rules and inferences which serve to imitate the expert's reasoning.

An illustrative knowledge base management system is the CLASSIC™ Knowledge Representation System, developed by AT&T Bell Laboratories, which allows a user to generate, maintain and access information in a knowledge base using a description language. In addition to characterizing and classifying objects in the domain of interest, a knowledge representation system, such as the CLASSIC™ Knowledge Representation System, will typically maintain the interrelationships among objects-in the knowledge base. In this manner, when new information is added to the knowledge base or when existing information is updated, other pieces of related information that are dependent upon the added or updated information may be properly updated.

Clearly, the importance of maintaining accurate information in a knowledge base at all times cannot be overemphasized. Knowledge base management systems will often provide a comprehensive mechanism for maintaining the dependency relationships between pieces of information in most instances. However, prior knowledge base management systems did not maintain the dependency information that was implicated upon execution of user-defined test functions.

A test function, or procedural test, which allows a user to program desired restrictions that are not possible within the limited confines of the description language, is written in a host programming language outside the realm of the knowledge representation system. Accordingly, a conventional knowledge representation system is unaware of the dependencies created by execution of the user-defined test functions.

As is apparent from the above discussion of the prior art, a need exists for a knowledge representation system that is capable of maintaining dependency information for procedural test functions. A further need exists for a knowledge representation system that provides a mechanism for processing dependency information that is returned from a user-defined test function in order to accurately maintain dependency information for test functions.

SUMMARY OF THE INVENTION

Generally, according to one aspect of the invention, a knowledge representation system is provided to allow a user to utilize a description language to generate, maintain and access information in a knowledge base. One embodiment of the knowledge representation system allows it to maintain the relationship among the different objects that are stored in the knowledge base by calculating and maintaining the dependency relationships between the different pieces of information. Thus, when new information is added to the knowledge base or existing information is modified in the knowledge base, other pieces of related information that are dependent upon the added or updated information may be properly classified at all times.

In one embodiment, the knowledge representation system maintains positive dependency information which indicates those individuals who must be reclassified if any information is added to the current individual and negative dependency information which indicates those individuals who must be reclassified if any information is removed from the current individual.

According to one aspect of the invention, the knowledge representation system accurately maintains the dependency information that is implicated upon execution of user-defined procedural test functions, which allow a user to program desired restrictions in the host language that are not possible with the description language. The knowledge representation system includes a mechanism for processing dependency information that is returned from the user-defined test function in order to accurately maintain the dependency information implicated by the user-defined test functions.

A subsumption function embodying principles of the present invention is provided to determine if a particular individual in the knowledge base satisfies a concept description. The subsumption function evaluates each component of a concept description and maintains the dependency information implicated by the concept component. A test restriction evaluation subroutine is preferably provided to determine whether test restriction components of the concept are satisfied by the individual being evaluated and to process the dependency information that is returned from the user-defined procedural test functions.

A more complete understanding of the present invention, as well as further features and advantages of the invention, will be obtained by reference to the detailed description and drawings.

BRIEF DESCRIPTION OF THE DRAWINGS

FIGS. 3a and 3b, collectively, illustrate the sample source code, doctor-file, that defines the told information which has been entered by the user for the sample knowledge base of FIG. 2;

FIG. 4 illustrates a number of records associated with individuals in the sample knowledge base that is defined by the sample source code, doctor-file, of FIGS. 3a and 3b;

FIG. 6 is a flow chart describing an exemplary test restriction evaluation subroutine as utilized by the subsumption function of FIGS. 5a and 5b.

DETAILED DESCRIPTION

Figure 1:
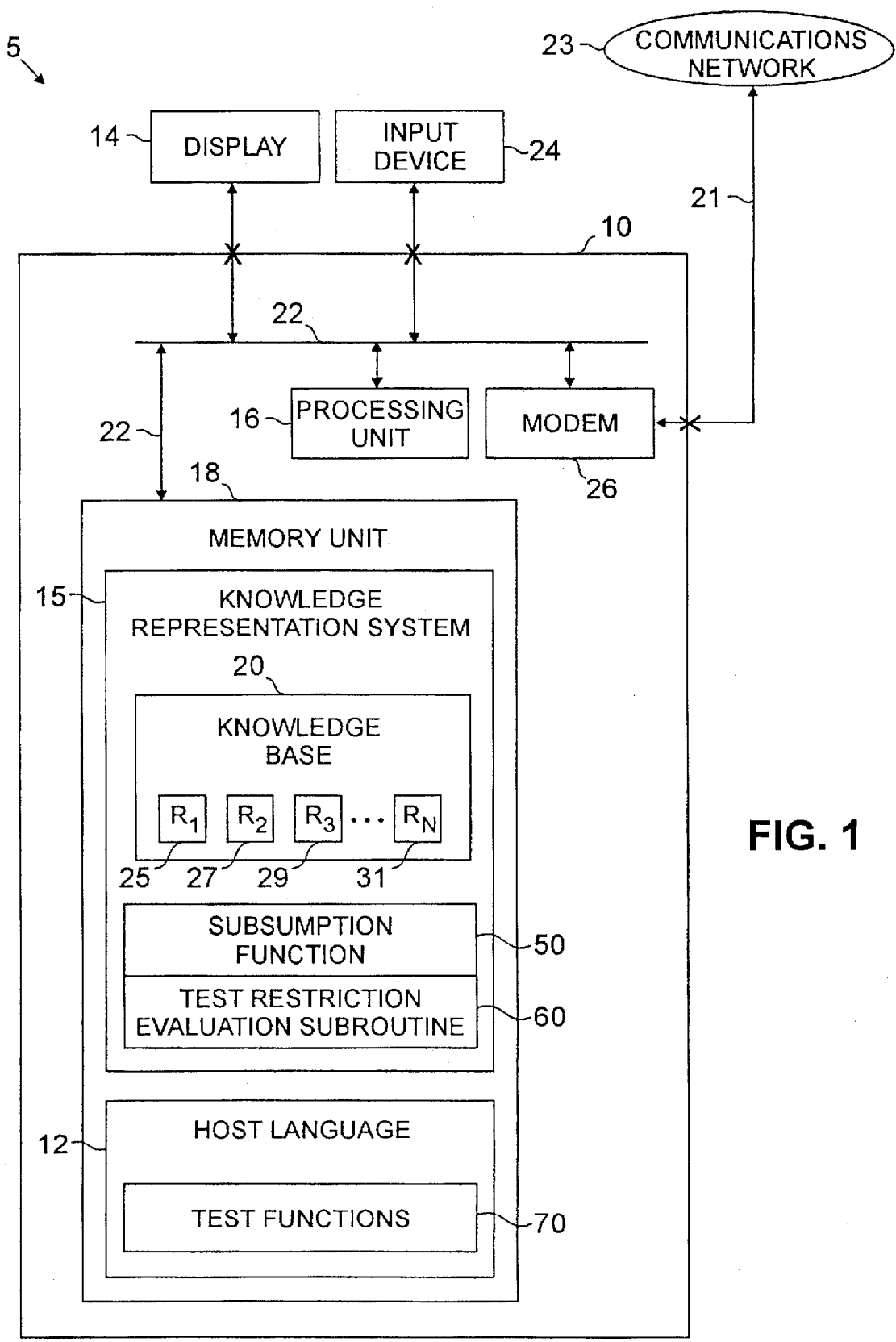
FIG. 1 is a schematic block diagram illustrating a knowledge base management system according to the present invention.

A knowledge base management system 5 according to the present invention is shown in FIG. 1. The knowledge base management system 5 allows a user to generate, maintain and access information in a knowledge base, such as the knowledge base 20. As shown in FIG. 1, the knowledge base management system 5 disclosed herein includes a general-purpose computing system 10, such as a workstation or personal computer, having a display 14, a processing unit 16, a memory unit 18, a modem 26, buses 22, and an input device or devices 24, such as a mouse, a keyboard or both.

The memory unit 18 of the host computer 10 preferably includes a host programming language 12, which may be any suitable high level programming language, such as the Common LISP or C programming languages. The knowledge base management system 5 may be interconnected with other knowledge base management systems, or remote data storage and collection devices via modem 26, data link 21 and communications network 23.

As discussed further below, the host computer 10 employs a knowledge representation system 15, which may be stored in the memory unit 18, to develop and interact with a knowledge base, such as the knowledge base 20. As discussed further below relative to FIG. 4, the knowledge base 20 will typically consist of a plurality of data structures or records, such as records $R_1$ 25, $R_2$ 27, $R_3$ 29, $R_n$ 31, for storing information on associated objects in the domain. It is noted that although the knowledge base 20 is illustrated as being stored in the memory unit 18, the knowledge base 20 may be stored in a remote memory device, as would be apparent to one skilled in the art.

As is well known, the information stored in a particular record, such as the record $R_1$ 25, associated with a given object includes "told" information that has been entered by a user about the object into the knowledge base management system 5, as well as "derived" information that may be ascertained about the given object based on the told information and certain inferences, discussed below. For a detailed discussion of a knowledge representation system 15 which explains how the derived information for a particular object in the knowledge base 20 was obtained, see our contemporaneously filed U.S. patent application Ser. No. 08/249,113 entitled "KNOWLEDGE BASE SYSTEM WITH ENHANCED EXPLANATION OF DERIVED INFORMATION AND OF ERROR OBJECTS", (Attorney Docket No. McGuinness 2-2-2), which is assigned to the assignee of the present invention, incorporated herein by reference.

The knowledge representation system 15 allows the user to employ a description language to make assertions about objects in the domain of interest, to identify classes of objects and to establish the relationship among the entered objects. As discussed further below, the knowledge representation system 15 will utilize the user's description of entered terms to classify the objects by finding their relationship to all previously specified terms.

In a preferred embodiment, the knowledge representation system 15 is embodied as a description-based knowledge representation system, such as the CLASSIC™ Knowledge Representation System, developed by AT&T Bell Laboratories, 600 Mountain Avenue, Murray Hill, N.J. 07974-0636, as modified herein to provide dependency information for procedural tests or test functions. The CLASSIC™ Knowledge Representation System is currently available in Common LISP and C implementations. For a detailed discussion of the CLASSIC™ Knowledge Representation System, see R. J. Brachman et al., Living With CLASSIC: How and When to Use a KL-One-like Language, in J. Sowa, ed., Principles of Semantic Networks: Explorations in the Representation of Knowledge; Morgan-Kaufmann Publishers, 1991, pp. 401–56; A. Borgida et al., CLASSIC: A Structural Data Model for Objects, Proc. of the 1989 ACM SIGMOD Int'l Conf. on the Management of Data, Portland, Oreg., SIGMOD RECORD, Vol. 18, No. 2, pp 58–67 (June, 1989), each incorporated herein by reference.

Alternatively, the knowledge representation system 15 may be embodied utilizing the BACK Terminological Representation System, available from the Technical University Berlin, Germany, and described in Thomas Hoppe et al., BACK V5 Tutorial & Manual, Technical University Berlin, Institute for Software and Theoretical Information, Project KIT-BACK, W-1000 Berlin 10, Germany (March, 1993); or the Loom Knowledge Representation System, available from the University of Southern California, Information Sciences Institute, Marina del Rey, Calif. 90292, and described in David Brill, Loom Reference Manual, Version 2.0, University of Southern California (Dec. 1993).

As illustrated in FIG. 1, the memory unit 18 of the host computer 10 may additionally include the program code necessary to execute a subsumption function 50 and a test restriction evaluation subroutine 60, described further below in conjunction with FIGS. 5a and 5b, and FIG. 6, respectively. Generally, a description-based knowledge representation system 15, such as the CLASSIC™ Knowledge Representation System, utilizes three kinds of formal objects to form the basic expressions that are used to create rules and to describe objects in the domain. First, "individuals" are intended to directly represent individual objects in the domain of interest. It is noted that an "individual" need not be a person. Second, "concepts" are descriptions that are applied to individuals. It is noted that an "object" in the knowledge base 20 is defined to be either a concept or an individual. Finally, "roles" are formal objects utilized to relate two individuals.

As discussed further below in conjunction with FIGS. 3a and 3b, a new concept is typically described in a description-based knowledge representation system 15, such as the CLASSIC™ Knowledge Representation System, by means of a concept description which may consist of a list of the more general concepts that are included within the definition of the new concept as well as a list of additional restrictions indicating ways in which the new concept differs from the more general concepts. Similarly, the typical way of describing a new individual in a knowledge representation system 15, such as the CLASSIC™ Knowledge Representation System, is to give a list of concepts that are satisfied by the individual and then to provide a list of additional restrictions specifying the ways in which the new individual differs from the satisfied concepts.

In addition, information may also be obtained about individuals in the knowledge base 20 based on certain rules that may have been established for the domain. For example, a knowledge base, such as the knowledge base 20, may include a concept VEGETARIAN that is defined to be satisfied if an individual only eats food of the type PLANT. Further, the knowledge base 20 may have a rule stating that anyone who is a VEGETARIAN is known to be a HEALTHY-THING. Thus, in order to classify an individual under the concept VEGETARIAN, the knowledge representation system 15 must know the type of food that the individual eats. However, once an individual is known to be a VEGETARIAN, the knowledge representation system 15 can immediately "fire" the rule and infer that the individual also satisfies the concept HEALTHY-THING.

Thus, a knowledge base, such as the knowledge base 20, typically consists of a plurality of defined concepts, individuals, roles and rules, and the relationships between them.

When information in the knowledge base 20 is added or updated, the knowledge representation system 15 must also update other pieces of related information that are dependent upon the added or updated information in order that all individuals in the knowledge base 20 may be properly classified at all times. For example, if a knowledge base, such as the knowledge base 20, maintains a concept PARENT-OF-A-DOCTOR, and a particular individual, Mary, has one child, John, who is not currently known to be a doctor, Mary would not be classified under the concept PARENT-OF-A-DOCTOR. However, the knowledge representation system 15 should preferably reclassify Mary under the concept PARENT-OF-A-DOCTOR if it subsequently became known that John was a DOCTOR.

Thus, in order to efficiently update related information in the knowledge base 20 that is dependent upon added or updated information, the knowledge representation system 15 preferably calculates and maintains the dependency relationships between pieces of information. In a preferred embodiment, the knowledge representation system 15 maintains a pair of negative dependency lists and a pair of positive dependency lists for each individual which are preferably stored in the record, such as the records $R_1$ through $R_N$ 25-31, in the knowledge base 20 associated with the individual, as discussed below in conjunction with FIG. 4. Specifically, a first positive dependency list, "POS-DEPENDS ON ME" is preferably maintained in each record, such as the records $R_1$ through $R_N$ 25-31, in order to list those individuals who must be reclassified if any information is added to the current individual. A second positive dependency list, "POS-I DEPEND ON", is preferably maintained in each record, such as the records 25-31, to list those individuals who will require the current individual to be reclassified if any information is added to the listed individuals. Similarly, a first negative dependency list, "NEG-DEPENDS ON ME" is preferably maintained in each record, such as the records 25-31, to list those individuals who must be reclassified if any information is removed from the current individual. A second negative dependency list, "NEG-I DEPEND ON", is preferably maintained in each record, such as the records 25-31, to list those individuals who will require the current individual to be reclassified if any information is removed from the listed individuals.

Figure 2:
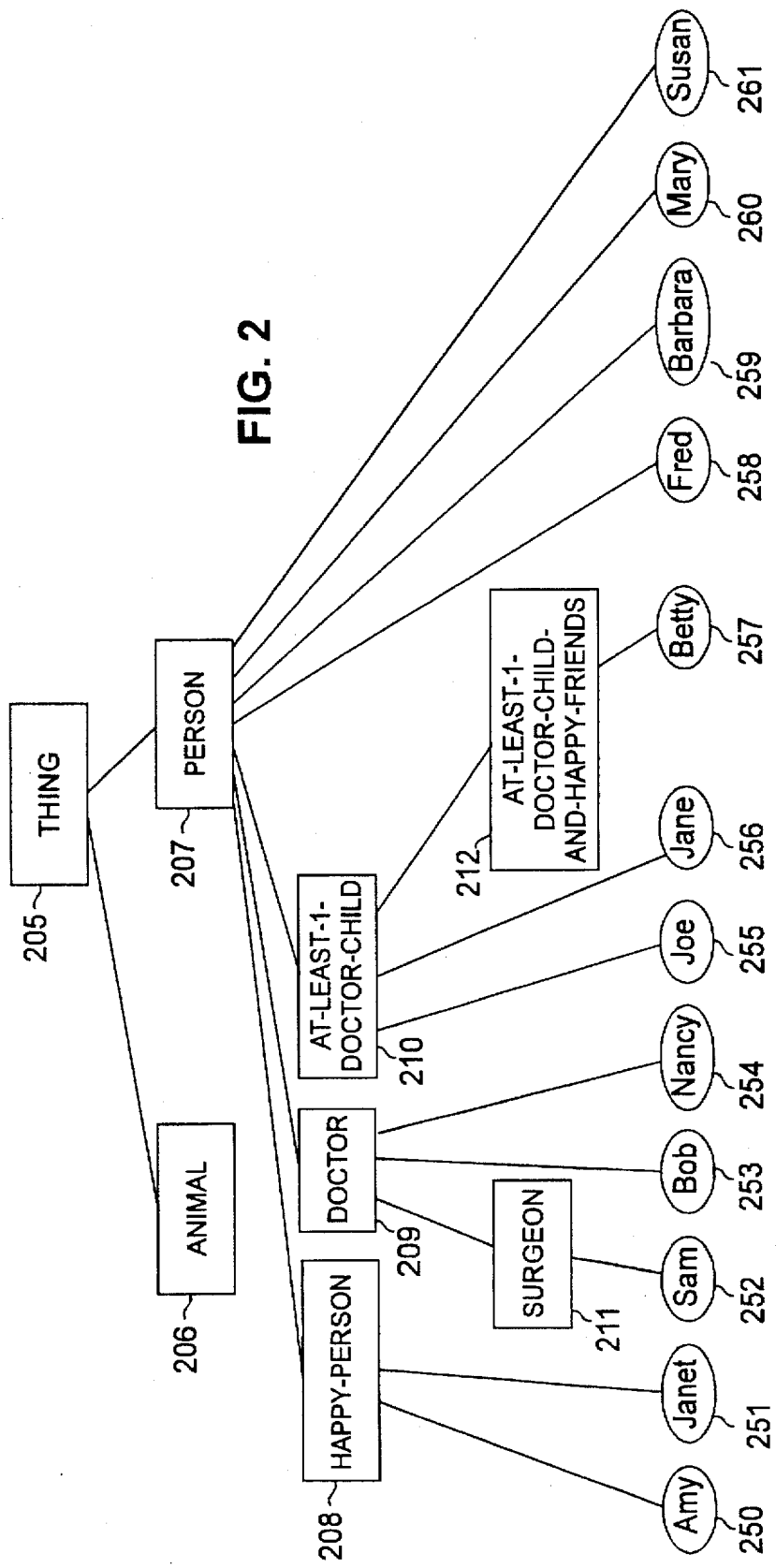
FIG. 2 provides a graphical illustration of the hierarchical relationship of a number of objects maintained in a sample knowledge base that is defined by the sample source code, doctor-file, of FIGS. 3a and 3b.

A sample knowledge base 20 is discussed below relative to FIGS. 2 through 4. FIG. 2 provides a graphical illustration of the hierarchical relationship of each of the objects in the sample knowledge base 20 that is defined upon execution of the sample source code, doctor-file, shown in FIGS. 3a through 3b, by the knowledge representation system 15. Each of the concepts in FIG. 2, such as the concepts 205 through 212, are presented in FIG. 2 in a rectangle with all capital letters. Each of the individuals in FIG. 2, such as the individuals 250 through 261, are presented in FIG. 2 in an oval with leading capitals only.

As is well known, the concepts 205-212 and individuals 250-261 that are established in a knowledge base, such as the sample knowledge base 20, for a particular domain are put into a hierarchy, as illustrated in FIG. 2. In this manner, a more general concept will be above a more specific concept in the hierarchy. For example, as shown in FIG. 2, the concept HAPPY-PERSON 208 is a more specific concept than the concept PERSON 207, because the concept HAPPY-PERSON 208 describes a particular type of PERSON 207.

Generally, a concept is classified by finding the concepts that are the "parents" and "children" of the concept being classified, as well as finding all individuals that are direct instances of the concept. In addition, as discussed further below, the knowledge representation system 15 will fire any rules that have been defined where the current concept is the antecedent of the rule on all individuals that satisfy the concept.

An individual 250-261 is found in the hierarchy underneath all of the concepts 205-212 in the hierarchy that the individual satisfies. An individual satisfies a concept if the individual satisfies every restriction in the concept definition. For example, individual Amy 250 is an instance of the concept HAPPY-PERSON 208, as well as the more general concepts PERSON 207 and THING 205. As discussed further below in conjunction with FIGS. 5a and 5b, a subsumption function 50 is provided to determine if an individual 250-261 satisfies a particular concept description and to maintain the appropriate dependency information.

The sample knowledge base 20 is defined by the sample source code, doctor-file, shown in FIGS. 3a and 3b. Following execution of lines 110 through 130 of the sample source code, doctor-file, the primitive concepts 205-209 and 211 are established in the knowledge base 20. For example, the concept PERSON 207 that appears in the hierarchy of FIG. 2 is defined in line 115 of the sample source code, doctor-file, to be a subtype of the concept THING 205 that was defined in line 110. Thus, as indicated in FIG. 2, the concept PERSON 207 will appear in the hierarchy below the more general concept THING 205.

It is noted that while a defined concept includes a list of necessary and sufficient conditions, a primitive concept is a concept that is defined only by an incomplete list of necessary conditions. As is well known, for an individual or a more specific concept to be classified under a primitive concept, a user must explicitly state that the individual or more specific concept is an instance of the primitive concept. For example, the primitive concept DOCTOR 209 is classified in the hierarchy of FIG. 2 below the primitive concept PERSON 207 because the user asserted in line 125 of the sample source code, doctor-file, shown in FIGS. 3a and 3b, that DOCTOR 209 is defined as a subtype of the primitive concept PERSON 207.

As set forth in line 105 of the sample source code, doctor-file, set forth in FIGS. 3a and 3b, an individual in the sample knowledge base 20 may be further characterized by means of the roles or properties, child and friend. Thus, a user may define the children or friends of an individual 250-261 in the sample knowledge base 20.

Due to the expressive limitations that are inherent in any description language, a knowledge representation system 15 will typically allow a user to make up for the limited expressive power of the description language by programming a desired restriction for a concept that is not possible within the description language using a test function 70 that is programmed in the host programming language 12. The test functions 70 that are programmed in the host language 12 are typically referred to as test restrictions, or procedural tests.

A test function 70 associated with a particular test restriction will typically return one of three values: TRUE, FALSE or UNKNOWN. The test functions 70 are three-valued functions in order that the knowledge representation system 15 can maintain partial information about individuals 250–261 in the domain. Thus, the test function 70 should determine whether an individual 250–261 provably satisfies the test restriction, provably fails the test restriction or currently neither provably succeeds nor fails the test restriction but could possibly succeed or fail the test restriction if more information is added to the knowledge base.

For example, in the sample knowledge base 20, the concept AT-LEAST-1-DOCTOR-CHILD 210 is defined in line 135 of the sample source code, doctor-file, to be a PERSON 207 that also must satisfy the test function, doctor-child-test-function, which is defined in lines 25 through 55 of the sample source code, doctor-file. The test function, doctor-child-test-function, which is written in the Common LISP programming language, receives the particular individual 250–261 being evaluated as an argument, as indicated in line 25. Thereafter, in lines 30 and 35, the doctor-child-test-function sets up the variables, child-role and children. The list variable, children, will be bound to a list of the fillers of the child role of the current individual being evaluated. During execution of line 40, the variable, doctor-child, will be bound to a TRUE value if the "find-if" statement determines that one of the children of the current individual being evaluated is a DOCTOR. The find-if statement will utilize the test function, instance-of-doctor, defined in lines 10 through 20 of the source code, doctor-file, to determine if any of the children of the current individual being evaluated satisfy the DOCTOR concept.

As is well known, however, since test functions are written in the host language 12 outside the realm of the knowledge representation system 15, conventional knowledge base management systems are not normally aware of dependencies created by execution of test functions, such as the doctor-child-test-function. Thus, a conventional knowledge representation system 15 cannot automatically maintain the dependency information that is implicated by execution of the test function. Specifically, if a test function 70 utilizes information about other individuals while evaluating whether a first individual satisfies the test restriction, and then information about the other individuals changes, a conventional knowledge representation system 15 would be unable to automatically reclassify the first individual.

Thus, according to one feature of the present invention, user-defined test functions 70 preferably return positive and negative dependency lists which are processed by the knowledge representation system 15 in order to accurately maintain dependency information for test functions. In a preferred embodiment, a user-defined test function 70 has three return values. The first return value indicates whether the individual being evaluated satisfies the test restriction (TRUE, FALSE or UNKNOWN). The second and third return values are the positive and negative dependency lists, if any.

For example, if an individual being evaluated satisfies the sample user-defined test function, doctor-child-test-function, shown in lines 25 through 55 of the sample source code, doctor-file, then the test function will return the values indicated in line 50. Specifically, the first return value will be t or TRUE indicating that this individual satisfies the test restriction. The second return value, the positive dependency list, is NIL here because positive dependencies are not normally implicated where the test restriction is satisfied. The third return value, the negative dependency list, will be the value of the variable, doctor-child, which indicates the child who has been found to currently be a doctor. If any information is removed from the child who is currently a doctor, then the parent would have to be reclassified.

Similarly, if an individual being evaluated does not satisfy the sample user-defined test function, doctor-child-test-function, shown in lines 25 through 55 of the sample source code, doctor-file, then the test function will return the values indicated in line 55. Specifically, the first return value will be ? or UNKNOWN indicating that this individual cannot currently be proven to satisfy the test restriction. The second return value, the positive dependency list, will be assigned the value of the variable, children, which indicates the names of each the children of the current individual being evaluated, none of whom are currently known to be doctors. If any information is added to any of the listed children, then the parent would have to be reclassified to determine if any of the children have become doctors. The third return value, the negative dependency list, is set to NIL here because negative dependencies are not normally implicated where a test restriction is not satisfied.

The reprocessing of individuals in the knowledge representation system 15 is dependent on the dependency values returned by the user-defined test functions. The more individuals that are listed on the returned dependency lists, the more that reprocessing has to be done. Thus, in order to minimize the amount of reprocessing that has to be performed by the knowledge representation system 15, the dependency lists returned from the user-defined test functions preferably satisfy the following properties.

First, when information is added to the knowledge base 20, then the value of the user-defined test function will not change, and it need not be reevaluated on an individual, so long as none of the individuals on that individual's positive dependency list gain any information. In addition, when information is removed from the knowledge base 20, then the value of the user-defined test function will not change, and it need not be reevaluated on an individual, as long as none of the individuals on that individual's negative dependency list lose any information.

It is noted that a user-defined test function can return any dependency list that satisfies the above conditions. In particular, such user-defined test functions could return the entire list of individuals in the knowledge base 20, although this would require some amount of unnecessary reprocessing. Thus, according to one feature of the invention, the user-defined test functions preferably return dependency lists that are minimal sets that satisfy the above restrictions. The description presented of the preferred embodiment provides for such minimal sets.

The manner in which the dependency information returned from the user-defined test function 70 is processed by the knowledge representation system 15 is discussed further below in conjunction with FIGS. 5a, 5b and 6.

Finally, the sample knowledge base 20 includes a concept AT-LEAST-1-DOCTOR-CHILD-AND-HAPPY-FRIENDS 212 which is defined in line 140 of the sample source code, doctor-file, by a compound expression requiring that the individual satisfy the AT-LEAST-1-DOCTOR-CHILD concept, in the manner described above, and adds an additional limitation that all fillers of the friend role of the individual must satisfy the concept HAPPY-PERSON 208.

Following execution of lines 155 through 210 of the sample source code, doctor-file, the individuals 250–261 in the sample knowledge base 20 are created. As set forth in lines 155 through 210, the user has asserted that the individuals satisfy certain concepts and that certain roles of the individuals are filled by previously defined individuals. For example, following execution of line 160, an individual, Susan 261, is created who is asserted to satisfy the primitive concept PERSON 207 and has her child role filled by the individual, Fred 258. Thus, since Fred 258 is not known to be a DOCTOR 209, Susan 261 will appear in the hierarchy under the concept PERSON 207, as shown in FIG. 2.

Similarly, following execution of line 175, an individual, Jane 256, is created who is asserted to satisfy the primitive concept PERSON 207 and has her child role filled by the individuals, Sam 252 and Mary 260. Thus, since Sam 252 is asserted during line 170 to be a SURGEON 211, which is defined as a type of DOCTOR 209, Jane 256 will appear in the hierarchy under the concept AT-LEAST-1-DOCTOR-CHILD 210, as shown in FIG. 2.

It is noted that the individual Joe 255 is classified in the hierarchy of FIG. 2 under the concept AT-LEAST-1-DOCTOR-CHILD 210, because Joe's child, Nancy 254, has been asserted during line 180 to be a DOCTOR. However, Joe 255 is not classified in the hierarchy of FIG. 2 under the concept AT-LEAST-1-DOCTOR-CHILD-AND-HAPPY-FRIENDS 212, because Joe has at most two friends, Amy 250 and Barbara 259, who do not all currently satisfy the concept HAPPY-PERSON 208. The individual Betty 257 is classified in the hierarchy of FIG. 2 under the concept AT-LEAST-1-DOCTOR-CHILD-AND-HAPPY-FRIENDS 212 because Betty's child, Bob 253, has been asserted to be a DOCTOR, and because Betty 257 has at most one friend, Janet 251, who is known to satisfy the concept HAPPY-PERSON 208.

It is noted that a role may typically be closed in a knowledge representation system 15 in two ways. First, a role may be closed explicitly by calling a function which serves to close the role. In addition, a role may be closed by implication where the role has been asserted or otherwise determined to have at most n fillers, for example through inheritance, and where there are n fillers, such as the friend role for the individuals Joe 255 and Betty 257, in lines 195 and 210 of the sample source code, doctor-file, respectively.

Often, a knowledge representation system 15 operates under an open world assumption. In other words, unless a specific role associated with an individual is closed by a user, or can be deduced to be closed, the knowledge representation system 15 will assume that there may be more fillers. This may cause a test function to return an UNKNOWN result value if a role is not closed. For example, if an individual, David, has three children, A, B and C, all of whom are LAWYERS, there is no way of knowing for sure that all of David's children are LAWYERS unless we can independently derive that David has no more children, for example, if it is asserted that David has at most three children.

FIG. 4 illustrates a number of sample records $R_1$ through $R_4$ associated with particular individuals of interest from the sample knowledge base 20 defined by the source code file, doctor-file, shown in FIGS. 3a through 3b. As shown in FIG. 4, each record, such as the records $R_1$ through $R_4$, indicate the parent concepts 205–212 under which the associated individual 250–261 may be found. In addition, each record, such as the records $R_1$ through $R_4$, indicate the fillers of the child and friend roles, if any, of the corresponding individual 250–261.

Finally, each record, such as the records $R_1$ through $R_4$, includes a pair of positive dependency lists, POS-DEPENDS-ON-ME and POS-I-DEPEND-ON, and a pair of negative dependency lists, NEG-DEPENDS-ON-ME and NEG-I-DEPEND-ON, as described above. For example, the record $R_1$, 25 associated with the individual Susan 261 includes a positive dependency list, POS-I-DEPEND-ON, which contains the name of her son, Fred 258. If information about Fred 258 was added, such that he was later found or asserted to be a DOCTOR, then Susan should be reclassified. Similarly, the record 31 associated with the individual Betty 257 includes a negative dependency list, NEG-I-DEPEND-ON, which contains the name of her son Bob 253, and her friend Janet 251. Bob 256 and Janet 251 are on Betty's negative dependency list because if information about Bob 253 was removed, such that he was no longer a DOCTOR, or if information about Janet 251 was removed, such that she was no longer a HAPPY-PERSON, then Betty 257 should be reclassified.

Figure 5A:
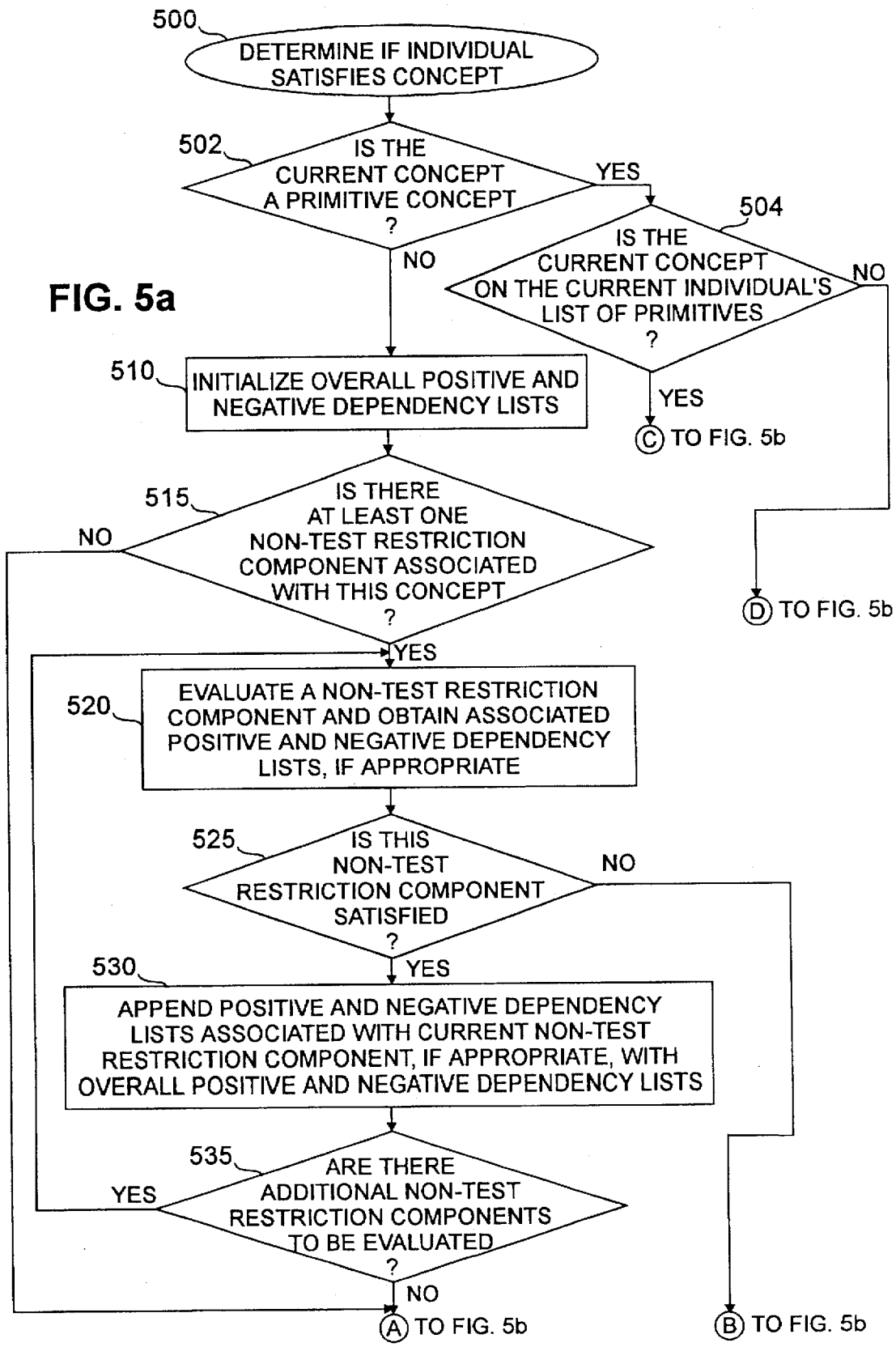
FIGS. 5a and 5b, collectively, are a flow chart describing an exemplary subsumption function as utilized by the knowledge base management system in determining whether an individual object is subsumed by a particular concept.

As illustrated in FIG. 5a, according to one embodiment of the present invention, a subsumption function 50 embodying principles of the present invention will be entered at step 500 each time the knowledge representation system 15 must classify a new individual in the knowledge base 20 or each time an existing individual must be reclassified upon the entry of new information for the individual or a related individual. The subsumption function 50 will determine whether a particular individual satisfies a particular concept description. An individual will be tested against all concepts below concepts which the individual is found or asserted to satisfy, to see how far down in the hierarchy the individual may be classified.

If a new concept is defined in the knowledge base 20, the new concept will first be classified in the hierarchy by the knowledge representation system 15. Thereafter, the knowledge representation system 15 will determine whether the individuals who are instances of the parent concepts of the new concept satisfy the new concept, in order to ensure that the individual is classified under the most specific concepts that subsume it in the hierarchy.

As discussed further below, the subsumption function 50 will utilize a test restriction evaluation subroutine 60, discussed below in conjunction with FIG. 6, to evaluate the test restriction components of each concept description. The test restriction evaluation subroutine 60 will, among other things, process the dependency information that is returned by user-defined test functions 70.

Upon entering the subsumption function 60, at step 500, a test is performed during step 502 to determine if the current concept being evaluated is a primitive concept. If it is determined during step 502 that the current concept being evaluated is a primitive concept, a test is performed during step 504 to determine if the current concept is on the current individual's list of primitive concepts, which have been asserted to be true. It is noted that, by definition, a primitive concept may not be satisfied unless the user has asserted that it is satisfied and that a primitive concept does not implicate dependency information. If it is determined during step 504 that the current concept is on the current individual's list of primitive concepts, then process control will proceed to step 570 (FIG. 5b) where the process will return with an indication that the current concept is satisfied.

If, however, it is determined during step 504 that the current concept is not on the current individual's list of primitive concepts, then the concept is not satisfied and process control will proceed to step 585 (FIG. 5b) where the process will return with an indication that the current concept is not satisfied.

If, however, it is determined during step 502 (FIG. 5a) that the current concept being evaluated is not a primitive concept, program control will proceed to step 510. The subsumption function 50 will preferably initialize an overall positive and negative dependency list during step 510. The positive and negative dependency lists are preferably local variables within the subsumption function 50 for accumulating the dependency information that is implicated during execution of the subsumption function 50 in order to update the actual dependency lists maintained in the record, such as the records 25–31, associated with the individual during steps 560 and 565 below, prior to returning from the subsumption function 50.

A test is performed during step 515 to determine if there is at least one non-test restriction component associated with the current concept being evaluated. As previously indicated, a concept definition may include a list of more general concepts that are included within the definition of the new concept as well as a list of additional restrictions indicating ways in which the new concept differs from the more general concepts. All of the restrictions in the concept definition that are not test restrictions are defined to be non-test restriction components.

If it is determined during step 515 that the concept definition does not include at least one non-test restriction component, program control will proceed to step 540 (FIG. 5b), and proceed in the manner described below.

If, however, it is determined during step 515 that the concept definition does include at least one non-test restriction component, the first non-test restriction component will be evaluated during step 520 to determine if this individual satisfies this component of the concept. If the non-test restriction component implicates dependency information, the positive and negative dependency lists will also be obtained during step 520, in a known manner. For example, certain types of restriction components do not implicate dependency information, such as ONE-OF restrictions. For each component implicating dependency information, the subsumption function 50 will preferably accumulate a negative dependency list, to list those individuals who will require the current individual to be reclassified if any information is removed from the listed individuals, as well as a positive dependency list, to list those individuals who will require the current individual to be reclassified if any information is added to the listed individuals.

A test is performed during step 525 to determine if this non-test restriction component of the concept has been satisfied. If it is determined during step 525 that this non-test restriction component has not been satisfied, program control will proceed to step 575 (FIG. 5b) and continue in the manner described below.

If, however, it is determined during step 525 that this non-test restriction component has been satisfied, the positive and negative dependency lists associated with the current non-test restriction component, if any, which were obtained during execution of step 520, will be appended to the overall positive and negative dependency lists being accumulated by the subsumption function 50 during step 530.

A test is performed during step 535 to determine if there are additional non-test restriction components of the current concept to be evaluated. If it is determined during step 535 that there are additional non-test restriction components of the current concept to be evaluated, program control will return to step 520 and continue in the manner described above.

Figure 5B:
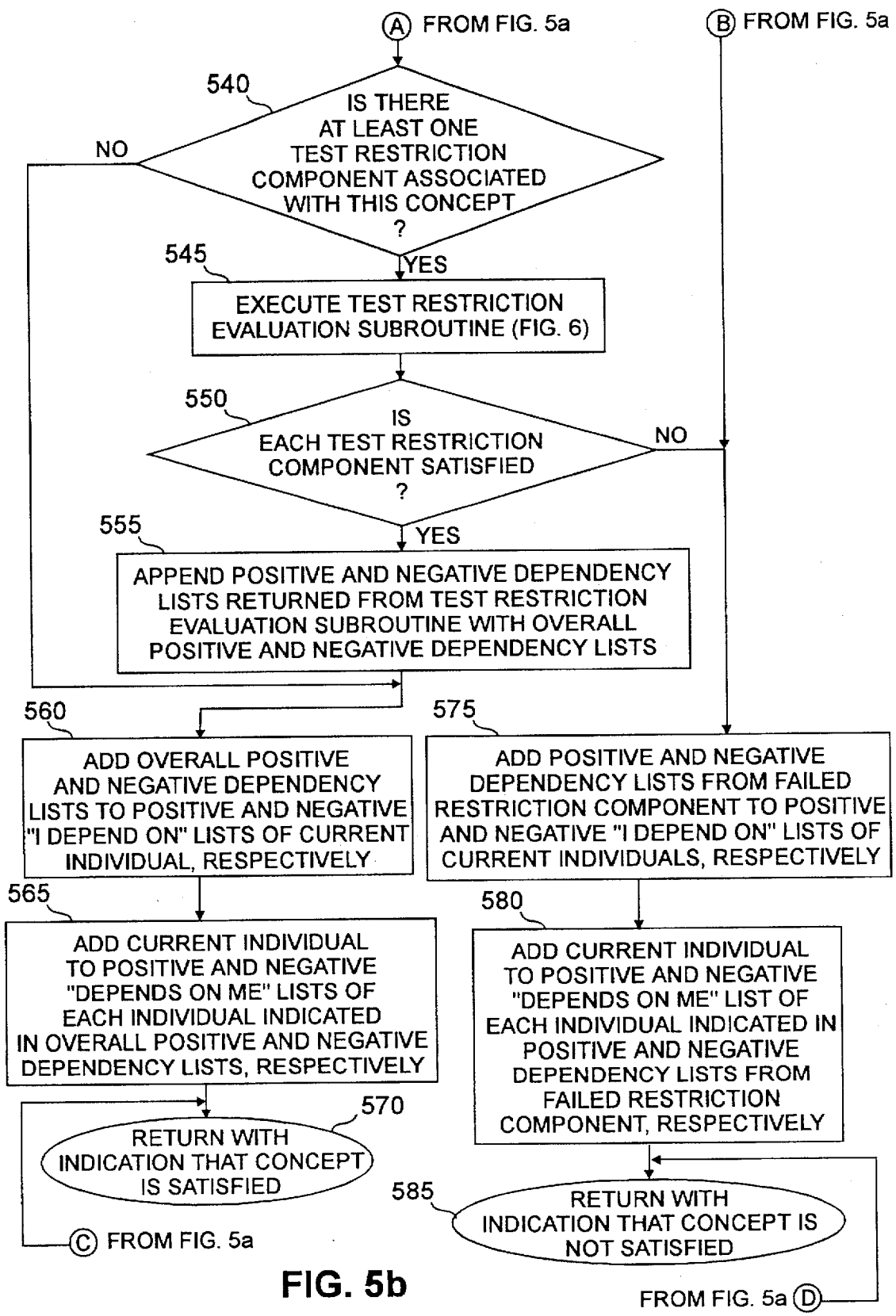

If, however, it is determined during step 535 that there are no additional non-test restriction components of the current concept to be evaluated, program control will proceed to step 540 (FIG. 5b).

A test is performed during step 540 (FIG. 5b) to determine if there is at least one test restriction component associated with the current concept being evaluated. If it is determined during step 540 that there are no test restriction components associated with the current concept being evaluated, program control will proceed to step 560, as discussed below.

If, however, it is determined during step 540 that there is at least one test restriction component associated with the current concept being evaluated, the test restriction evaluation subroutine 60 will be executed during step 545. The test restriction evaluation subroutine, which is discussed further below relative to FIG. 6, evaluates all of the test restriction components associated with the concept being evaluated and determines if the test restriction components are satisfied.

According to one feature of the invention, the test restriction evaluation subroutine 60 will also process the dependency information that is returned from each of the user-defined test functions 70. In this manner, the knowledge representation system 15 can maintain accurate and thorough dependency information for all aspects of an individual.

Following execution of the test restriction evaluation subroutine 60, a test is performed during step 550 to determine if each test restriction component of the concept is satisfied. If it is determined during step 550 that each test restriction component is not satisfied, program control will proceed to step 575 and continue in the manner described below.

If, however, it is determined during step 550 that each test restriction component is satisfied, the positive and negative dependency lists returned from the test restriction evaluation subroutine will be appended to the overall positive and negative dependency lists being accumulated by the subsumption function 50 during step 555.

During step 560 the positive and negative dependency lists that have been accumulated during execution of the subsumption function 50 are preferably added to the "POS-I DEPEND ON" and "NEG-I DEPEND ON" dependency lists found in the record, such as the records 25–31, associated with the current individual being evaluated.

In addition, during step 565, the current individual is added to the "POS-DEPENDS ON ME" and "NEG-DEPENDS ON ME" dependency lists of each individual indicated in the overall positive and negative dependency lists that have been accumulated during execution of the subsumption function 50.

If program control has reached step 570, the current concept is satisfied. Thus, program control will return during step 570 with an indication that the current concept is satisfied.

If, however, it was determined during step 525 or step 550 that a component of the current concept is not satisfied, the positive and negative dependency lists from the failed restriction component are preferably added during step 575 to the "POS-I DEPEND ON" and "NEG-I DEPEND ON" dependency lists found in the record, such as the records $R_1$ through $R_N$ 25–31, associated with the current individual being evaluated. It is noted that dependency information need only be retained for one failed component of the concept because as long as this one component is not satisfied, the overall concept will not be satisfied.

In addition, during step 580, the current individual is added to the "POS-DEPENDS ON ME" and "NEG-DEPENDS ON ME" dependency lists of each individual indicated in the positive and negative dependency lists associated with the failed restriction component. Thereafter, program control will return during step 585 with an indication that the current concept is not satisfied.

As previously indicated, the subsumption function 50 will execute a test restriction evaluation subroutine 60 during step 545. The test restriction evaluation subroutine 60, illustrated in FIG. 6, will be entered at step 605.

The test restriction evaluation subroutine 60 will preferably initialize an overall test restriction positive and negative dependency list during step 610. The test restriction positive and negative dependency lists are preferably local variables within the test restriction evaluation subroutine 60 for accumulating the dependency information that is implicated during execution of the test restriction evaluation subroutine 60 in order to return the test restriction dependency information to the subsumption function 50.

A test is performed during step 620 to determine if the current test restriction being evaluated has been asserted to be true for this individual. If it is determined during step 620 that the current test restriction being evaluated has been asserted to be true for this individual, then there is no need to perform the test function and no dependency information is implicated. Thus, program control will proceed to step 645, as described below.

If, however, it is determined during step 620 that the current test restriction being evaluated has not been asserted to be true for this individual, then the test restriction evaluation subroutine 60 will preferably initialize the current test restriction positive and negative dependency lists during step 625. The current test restriction positive and negative dependency lists will store the dependency information for the current test restriction that is being evaluated, in order that the dependency information for a failed test restriction may be isolated.

The test function associated with the current test restriction being evaluated is executed during step 630. For example, the concept AT-LEAST-1-DOCTOR-CHILD 210 was defined during line 135 of the sample source code, doctor-file, to be a PERSON 207 that also must satisfy the test function, doctor-child-test-function, defined in lines 25 through 55 of the sample source code, doctor-file. Thus, while evaluating whether a particular individual satisfies the concept AT-LEAST-1-DOCTOR-CHILD 210, the test restriction evaluation subroutine 60 must determine whether the individual satisfies the test restriction component defined by the test function, doctor-child-test-function. The user-defined test function, doctor-child-test-function, will return three values. The first return value indicates whether the test function is satisfied. The second and third return values are the positive and negative dependency lists, respectively.

A test is performed during step 635 to determine if the current test restriction has been satisfied, as indicated by the first value returned from the user-defined test function. If it is determined during step 635 that the current test restriction has not been satisfied, program control will proceed to step 655, as discussed further below.

If, however, it is determined during step 635 that the current test restriction has been satisfied, the positive and negative dependency lists returned by the current user-defined test function will be appended to the overall test restriction positive and negative dependency lists during step 640.

A test is performed during step 645 to determine if there are additional test restriction components of the current concept to be evaluated. If it is determined during step 645 that there are additional test restriction components of the current concept to be evaluated, program control will return to step 620 and continue in the manner described above.

If, however, it is determined during step 645 that there are no additional test restriction components of the current concept to be evaluated, program control will proceed to step 650.

If program control reaches step 650, all of the test restriction components of the current concept are satisfied. Thus, program control returns to the subsumption function 50 during step 650 with an indication that each test restriction component is satisfied. In addition, the overall test restriction positive and negative dependency lists are also returned to the subsumption function 50 during step 650 for processing in the manner described above.

If however, one of the test restriction components is found to not be satisfied during execution of step 635, program control will proceed to step 655. Thus, during step 655 program control will return to the subsumption function 50 with an indication that at least one test restriction component is not satisfied. In addition, the positive and negative dependency lists associated with the current failed test restriction are also returned to the subsumption function 50 during step 650 for processing in the manner described above.

Thus, accurate and thorough dependency information is stored at all times in the record, such as records 25–31, associated with each individual, including dependencies created by execution of user-defined test functions. In this manner, when information is later added for a particular individual, the knowledge representation system 15 can access the "POS-DEPENDS ON ME" dependency list for the updated individual to determine which other individuals may potentially have to be reclassified. Similarly, when information is later removed from a particular individual, the knowledge representation system 15 can access the "NEG-DEPENDS ON ME" dependency list for the updated individual to determine which other individuals may potentially have to be reclassified.

It is to be understood that the embodiments and variations shown and described herein are illustrative of the principles of this invention only and that various modifications may be implemented by those skilled in the art without departing from the scope and spirit of the invention.

One such modification is to change the granularity of objects stored on the dependency lists from individuals to particular aspects of individuals. For example, instead of storing Bob on the "NEG-I-DEPEND-ON" list of Betty, as shown in record 31 of FIG. 4, an indication of whether Bob is a doctor could be stored on the list. In this manner, if something other than the fact that Bob is a doctor changes about Bob, then Betty will not need to be reclassified.

We claim:

1. In a knowledge base system of the type having a description language, having means for maintaining a classification hierarchy based upon stored dependency information which relates pieces of information stored in said knowledge base, the improvement comprising;

means for specifying a procedural test by allowing a user to program in a language other than the description language a desired restriction not expressible in the description language;

means in the procedural test for returning dependency information implicated upon execution of the procedural test; and means in the classification means responsive to the returned dependency information for updating said stored dependency information as required by the returned dependency information.

2. The system of claim 1 wherein said returned dependency information returned from said procedural test consists of minimal dependency lists.

3. The system of claim 1 wherein said dependency information returned from said procedural test consists of positive and negative dependency lists.

4. A method for use in a knowledge base system for maintaining dependency relationships between pieces of information stored in said knowledge base, said knowledge base system including a description language, said dependency maintenance method comprising the steps of:

specifying a procedural test by allowing a user to program in a language other than the description language a desired restriction not expressible in the description language;

receiving dependency information returned from said user-defined test function; and processing said dependency information returned from said user defined test function in order to update said stored dependency relationships between said pieces of information stored in said knowledge base.

5. The dependency maintenance method of claim 4, wherein said returned dependency information returned from said user-defined test function consists of minimal dependency lists.

6. The dependency maintenance method of claim 4 wherein said dependency information returned from said user-defined test function consists of positive and negative dependency lists.

7. A method for use in a knowledge base system having a description language and a classification hierarchy for determining if an object in said knowledge base satisfies a concept in said knowledge base said method comprising the steps of:

defining a restriction having at least one component defined by a user-defined test function which allows a user to program a desired restriction that is not expressible in the description language;

determining if said at least one component of said restriction is satisfied by said object;

receiving dependency information returned upon execution of said user-defined test function; and processing said dependency information returned from said user-defined test function in order to update said stored dependency relationships between said pieces of information stored in said knowledge base.

8. The method of claim 7, wherein said returned dependency information returned from said user-defined test function consists of minimal dependency lists.

9. The method of claim 7 wherein said dependency information returned from said user-defined test function consists of positive and negative dependency lists.

10. A method for use in a knowledge base system for maintaining dependency relationships between pieces of information stored in said knowledge base for individual objects, said knowledge base system including a description language, said dependency maintenance method comprising the steps of:

generating a procedural test by allowing a user to program in a language other than the description language a desired restriction that is not expressible in the description language;

executing the user-defined procedural test;

maintaining a positive dependency list for each of said individual objects stored in said knowledge base, said positive dependency list indicating those other individual objects is said knowledge base which may have to be reclassified if information is added to said individual object associated with said positive dependency list;

receiving positive dependency information returned upon execution of said user-defined test function;

processing said positive dependency information returned from said user-defined procedural test in order to update said stored positive dependency lists; and determining if said other individual objects indicated in said positive dependency list need to be reclassified if information is added to said individual object associated with said positive dependency list.

11. A method for use in a knowledge base system for maintaining dependency relationships between pieces of information stored in said knowledge base for individual objects, said knowledge base system including a description language, said dependency maintenance method comprising the steps of:

generating a procedural test by allowing a user to program in a language other than the description language a desired restriction that is not expressible in the description language;

executing the user-defined procedural test;

maintaining a negative dependency list for each of said individual objects stored in said knowledge base, said negative dependency list indicating those other individual objects in said knowledge base which may have to be reclassified if information is removed from said individual object associated with said negative dependency list;

receiving negative dependency information returned upon execution of said user-defined test function;

processing said negative dependency information returned from said user-defined procedural test in order to update said stored negative dependency lists; and determining if said other individual objects indicated in said negative dependency list need to be reclassified if information is removed from said individual object associated with said negative dependency list.

\* \* \* \* \*